MAGNETIC DEVICE COMPOSED OF A SEMICONDUCTING FERROMAGNETIC MATERIAL
Filed Sept. 9, 1963

INVENTORS
SIEGFRIED J. METHFESSEL
FREDERIC HOLTZBERG
BY Allen A. Meyer, Jr.
ATTORNEY United States Patent Office 3,271,709
Patented Sept. 6, 1966

3,271,709

MAGNETIC DEVICE COMPOSED OF A SEMI-CONDUCTING FERROMAGNETIC MATERIAL

Siegfried J. Methfessel, Montrose, and Frederic Holtzberg, Pound Ridge, N.Y., assignors to International Business Machines Corporation, New York, N.Y., a corporation of New York Filed Sept. 9, 1963, Ser. No. 307,521
10 Claims. (Cl. 335—209)

Figure 1:
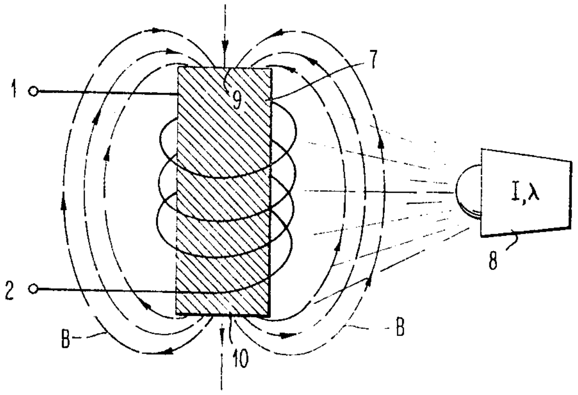

This invention relates to a ferromagnetic device for modulating and controlling the magnetic flux density by varying the density of conduction carriers (number of carriers per cubic cm. in the semiconducting ferromagnetic body of the device. More particularly, this invention relates to a device consisting of a semi-conducting ferromagnetic body (less than $10^{20}$ conduction carriers per cubic centimeter) with conduction carrier density controlled ferromagnetism, with a means of modulating the carrier density (e.g., electric field, light source), and means for producing a magnetizing magnetic field to align the atomic magnetic moments in a preferred direction (e.g., magnetic poles or electric current loops). The semiconducting ferromagnetic body is maintained at a working temperature near its ferromagnetic Curie temperature. When the semiconducting ferromagnetic body is subjected to the magnetizing magnetic field produced by magnetic poles or electric current loops, then the body produces a magnetic flux density which is controlled by the intensity (or wavelength) of the light incident on the semiconducting ferromagnetic body, or by the electric field applied to the body or any other means known in the semiconducting art for controlling conduction carrier densities.

The phenomenon of conduction carrier controlled ferromagnetism has been studied theoretically, and the Curie temperature of rare earth metals and their metallic alloys has been explained theoretically by P. G. de Gennes (Compt. rend. 247, 1836 (1958)), on the basis of the indirect exchange theory of M. A. Ruderman and C. Kittel (Phys. Rev. 96, 99 (1954)); K. Yosida (Phys. Rev. 106, 893 (1957)); and T. Kasuya (Progr. Theoret. Phys. (Kyoto) 16,45 (1956). Since magnetic moment of the rare earth ions produced by partially filling the 4*f* electron shells cannot be coupled with one another by direct overlapping of the 4*f* electron shells (the diameter of these shells is only about one-quarter of the ionic diameter), the coupling of the atomic magnetic moments takes place via the conduction electrons. The density of the electrons in the conduction bands is the order of $10^{23}$ electrons per cubic centimeter which with produces, e.g., in Gd metal, a Curie temperature of about 300° K.

The application of the indirect exchange theory to semiconductors has been discussed by W. Baltensberger and A. M. de Graaf in the article entitled, "Long Range Interactions Between Magnetic Moments in Semiconductors," (Helv. Phys. Acta. vol. 33, Fasc. 8, pages 881–888 (1960)). In this article, it was pointed out that in the semiconducting materials ($10^{20}$ carriers per cubic cm.) a very small ferromagnetic interaction corresponding to a Curie temperature of fractions of a degree Kelvin should be expected. Based on such a statement, it was considered impossible to make use of indirect exchange for carrier density control of ferromagnetism in semiconductors.

Until this time, experimental investigations of semiconducting rare earth compounds have been particularly directed toward the inventigation of their semiconducting and thermoelectric properties. Trivalent rare earth—Group VI–A compounds, as for example, the compounds in the composition range of 2:3 to 3:4 (or from 57.15 to 60 mol percent chalcogen), have been studied for their magnetic properties by R. C. Vickery and H. M. Muir ("Observations on Some Gd–Se Compounds") Rare Earth Research, edited by E. V. Kleber (1961) pp. 223–230, with the result, "In no instance has ferromagnetism been found to develop in this system . . ." (p. 227).

Divalent rare earth-VI–A compounds, such as EuO, EuS, and EuSe, have been found to be ferromagnetic below 77° K., 18° K., and 7° K. respectively, but no conduction carrier density controlled ferromagnetism was observed.

It is well known that magnetic flux densities can be produced by ferromagnetic materials maintained below the Curie temperature and subejcted to a magnetizing magnetic field produced by magnetic poles or electric current loops. The magnetic flux densities of such magnets can be varied only by variation of the magnetizing magnetic field or the temperature of the ferromagnetic material. In this type of magnet, there is no relationship between magnetic flux density and the carrier density in the conduction band which can be used to modulate the magnetic flux density without changing the chemical composition of the ferromagnetic body, except at high frequency where the electrical resistivity influences the magnetic flux density by the skin effect (i.e., reduced penetration depth of the high frequency magnetizing magnetic field into the metallic ferromagnetic body).

The present invention is a device for producing a magnetic flux density which is modulated by the intensity or wavelength of incident light, applied electric field, or by variation of any other quantity known in the semiconductor art to influence the conduction carrier density. The magnetizing magnetic field and temperature of the semiconducting ferromagnetic body can be kept constant while this type of magnetic flux density control (modulation) is in operation. Furthermore, when the magnetizing magnetic field or temperature are permitted to vary, for each value of the magnetizing magnetic field and temperature, the magnetic flux density is no longer restricted to a single value but exhibits a continuum of values related to the electrical conductivity produced by the conditions of operation in the semiconducting ferromagnetic body.

It is an object of the invention to provide a ferromagnetic device producing modulated or controlled magnetic flux density.

It is another object of the invention to provide a ferromagnetic device producing a magnetic flux density which is modulated or controlled by varying the density of conduction carriers in the semiconducting ferromagnetic body of the device.

It is a further object of the invention to provide a ferromagnetic device consisting of a semiconducting ferromagnetic body, (with conduction carrier density controlled ferromagnetism), means for producing a magnetizing magnetic field to align the atomic magnetic moments and means for modulating the carrier density.

Another object of the invention is to provide a ferromagnetic device which produces a magnetic flux density which is controlled by the intensity (or wavelength) of light incident upon the semiconducting ferromagnetic body.

Still another object of the invention is to provide a ferromagnetic device which produces a magnetic flux density which is controlled by the electric field applied to the semiconducting ferromagnetic body.

A further object of the invention is to provide a ferromagnetic device which produces a modulated or controlled magnetic flux density in which the conduction carrier density is controlled by the intensity (or wavelength) of light incident upon the semiconducting ferromagnetic body.

Further, another object of the invention is to provide a ferromagnetic device which produces a modulated or controlled magnetic flux density and in which the conduction carrier density is controlled by the electric field applied to the semiconducting ferromagnetic body.

It is still a further object of the invention to prepare a semiconducting ferromagnetic material with conduction carrier density controlled ferromagnetism.

It is a further object of the invention to prepare the semiconducting ferromagnetic material $$Y_{0.517}Gd_{1.655}Se_{3.000}$$

The foregoing and other objects, features and advantages of the invention will be apparent from the following more particular description of preferred embodiments of the invention, as illustrated in the accompanying drawings.

Figure 2:
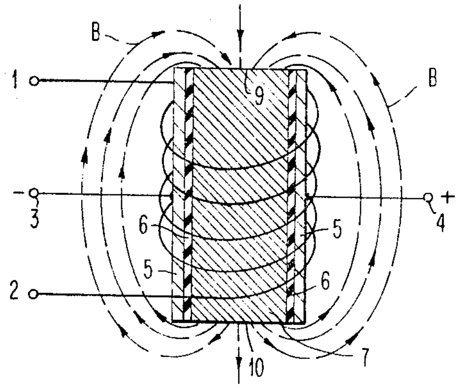
Figure 3:
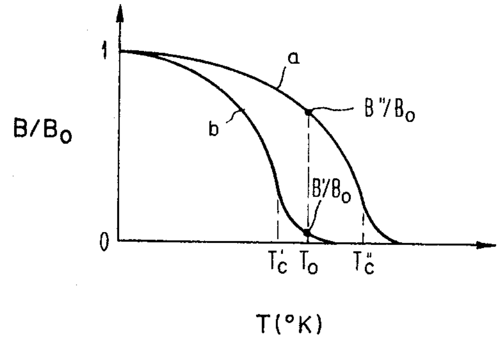

FIG. 1 is a schematic representation of a device for producing a magnetic flux density B, modulated by the variation of the intensity I, or the wavelength λ of the incident light;

FIG. 2 is a schematic representation of a device producing a magnetic flux density B, modulated by an electric field applied between the plates of an electric condenser in which the semiconducting ferromagnetic body takes the place of a dielectric; and FIG. 3 graphic representations of the magnetic flux density B (reduced by the magnetic flux density $B_0$ obtainable at constant magnetizing magnetic field at 0° K.) as a function of the temperature T are shown in curve *a* for high conduction carrier density corresponding to the Curie temperature $T_c''$, and in curve *b* for low conduction carrier density corresponding to the Curie temperature $T_c'$.

The device of the invention produces a magnetic flux density which can be modulated or controlled by variations in the intensity or in the wavelength of incident light or variations in the strength of an applied electrical field, or in any other quantities known in semiconductor physics to influence the density of the carriers in the conduction band. In its most basic form, the device of the invention includes the following parts:

I. A semiconducting ferromagnetic body of a shape which is known to be suitable for a ferromagnetic material in order to concentrate or to distribute the magnetic flux generated by it over a given volume in a way which is desired for the further use of the magnetic flux for producing mechanical forces, inducing electrical fields or for other purposes( e.g., transformer cores, flux closing yokes, relay cores, shaped pole pieces, memory toroids, etc.).

The material of the body in the device of the invention, however, is significantly different from other known ferromagnetic or antiferromagnetic metals or oxides in that it has a ferromagnetic Curie temperature or antiferromagnetic Néel temperature which can be shifted to higher or lower values by variation of conditions which are known in semiconductor art to influence the number of the carriers in the conduction band (e.g., incident light, applied electric field, change in temperature, etc.). In order to have the desired relation between magnetic transition temperatures and density of carriers in the conduction band, the material has to meet the following special requirements:

(a) There must be ferromagnetic or antiferromagnetic alignment of the atomic magnetic moments which is effected by the conduction carrier density. The mechanism of indirect exchange is effected by the free electrons in metals and has been treated theoretically by M. A. Rudermann and C. Kittel (Phys. Rev. 96, 99 (1954)); K. Yosida (Phys. Rev. 106, 893 (1957)); and T. Kasuya (Progr. Theoret. Phys. (Kyoto) 16, 45 (1956)) and is accepted as valid for the rare earth metals and their metallic alloys. Although theoretical investigations of W. Baltensberger and A. M. de Graaf in the article "Long Range Interactions Between Magnetic Moments in Semiconductors" (Helv. Phys. Acta, vol. 33, Fasc. 8, pages 881–888 (1960)) clearly established that the magnetic coupling the order of fractions of a degree .).
tion carrier density $N<10^{20}$cm.$^{-3}$ is negligibly small (of the order of fractions of a degree.)

(b) In order to give to the device the desired sensitivity to light, electric field, or other means which are known to change the density of conduction carriers in semiconductors, the material has to be a semiconductor with a carrier density, $N<10^{20}$cm.$^{-3}$, which value is much smaller than that of $N\sim10^{23}$cm.$^{-3}$ found in the rare earth metals and their alloys mentioned under (a).

(c) The indirect exchange mechanism in the material has to be efficient enough to produce, with the low conduction carrier concentration of a semiconductor, a strength of ferromagnetic or antiferromagnetic coupling between the atomic magnetic moments which is necessary to establish a Curie or Néel temperature near to the desired working temperature ($T_0$) of the device.

(d) The strength of the coupling between the atomic magnetic moments has to be a strongly varying function of the conduction carrier concentration so that achievable variations in the carrier concentration produce a significant shift in the Curie temperature or Néel temperature.

The ferromagnetic or antiferromagnetic coupling between the atomic magnetic moments produced by the carrier density in the conduction band does not necessarily have to be the only coupling between atomic magnetic moments present in the material. There might be other coupling between atomic magnetic moments such as superexchange over metalloid ions, dipole interactions, overlapping 3*d* orbitals of transition metal ions, etc. The use of the material in a device of the present invention requires only that a variation of the conduction carrier concentration produced by conditions, known in semiconductor art to influence the conduction carrier concentration, results in a variation of the ferromagnetic Curie temperature or antiferromagnetic Néel temperature which is made up by the interaction of all couplings between atomic magnetic moments present in the material and can be observed directly by measuring the magnetic transition temperature.

It has been found that there are (in contradiction to Baltensberger and Graaf's theoretical studies mentioned previously) compounds of the rare earth metals with the VI–A elements (S, Se, and Te) which at certain compositions meet the requirements for materials useable in the present magnetic flux producing device. The compounds are mentioned here only as examples for suitable body materials and should not restrict the device to the use of only these compounds as body materials.

The compounds suitable for body materials can, for example, have the basic composition $M_2A_3$, where M is a rare earth selected from group consisting of La, Ce, Pr, Nd, Sm, Eu, Gd, Tb, Dy, Ho, Er, Tm, Yb, Lu and Y, and A is a chalcogen selected from the group S, Se, and Te. These compounds crystallize with the $Th_3P_4$ structure in the space group $I\bar{4}\ 3d\text{–}T^6_D$. The room temperature electrical resistivity of these compounds is of the order 0.1—1000 Ω cm. with a negative temperature coefficient of resistivity, i.e., they are semiconducting materials. The compounds, in general, obey the Curie-Weiss law $\chi=C/(T-\Theta)$ with $\Theta\leqq0$, where $\chi$ is the magnetic susceptibility of the material (flux density per unit of the magnetizing magnetic field), C is a constant proportional to the square of atomic magnetic moment, T is the absolute temperature, and $\Theta$ the paramagnetic Curie temperature.

The room temperature resistivity of these compounds can be changed by doping (i.e., adding small amounts of constituents in order to increase the carrier concentration to a value higher than that observed for the stochiometric composition of the compound). Since the magnetic transition temperatures have been found to be a function of the conduction carrier concentration, it is possible to adjust the magnetic transition temperature by doping to a level which provides a maximum efficiency for the use in the device of the invention.

Since the specific method of preparation and the particular concentrations of the ferromagnetic semiconducting material are critical in obtaining the requirements set forth above for the body of the material of the device of the invention, a description of the preparation of suitable materials for use in the body of the device of the invention is set forth.

Examples of methods of preparing semiconducting $M_2A_3$ compounds (where M is a rare earth selected from the group consisting of La, Ce, Pr, Nd, Sm, Eu, Gd, Tb, Dy, Ho, Er, Tm, Yb, Lu, and Y and A is a chalcogen selected from the group consisting of S, Se, and Te) can be found in the literature. One such method is described in the article, "Observations on Some Gadolinium-Selenium Compounds," by R. C. Vickery and H. M. Muir, (Rare Earth Research, the McMillan Company, New York, 1961, page 223). Vickery and Muir's method produces a dense product of questionable composition (the volatilization of Se being uncontrolled) and of questionable contamination with such gases as oxygen, nitrogen, etc. Any reactive gas, in particular oxygen, contaminating the sample leads to compounds which do not exhibit the ferromagnetic or antiferromagnetic properties required for the use of the material in the device of the invention.

The following procedure, developed for the formation of materials useful in the body of the device of the invention, is an example of a method of preparation which is specifically directed toward the exclusion of undesirable impurities coming from the reaction chamber as well as from any contaminating or reactive gases. It further provides a means of control of the rapid, highly exothermic reaction thereby preventing explosions.

*Example 1*.—$Gd_2Se_3$ 5.71 grams of Gd 99.9% pure filed into a fine powder in a dry oxygen-free atmosphere and mixed with 4.29 grams of selenium 99.9% pure pellets of approximately ⅛″ diameter (the pellet size being critical in the control of the highly exothermic reaction), and placed in a quartz bomb. The bomb is then evacuated and sealed by fusing the quartz above the sample level. The quartz bomb is cooled with a moist asbestos wick during the sealing operation in order to prevent the volatilization of selenium. The bomb is then placed in a furnace and heated at a slow rate initially (approximately 20°/hr.) to 250° C. The rate of vapor transport of selenium to the metal filings is sufficient at this temperature to coat the filings with a selenide and prevent violent reaction. The temperature is then raised to a maximum of 600° C. (to insure that no oxygen diffuses out of the quartz used in these containers) and is held there for 4 days. The resulting material is a finely divided black powder. The quartz tube is opened in a helium-purged dry box and the powder is pressed into pellets, which are then placed in a crucible. The crucible is made of a material that does not enter into the reaction (e.g., tantalum, molybdenum). The size of the pellet is such that the pellet provides a piston fit to the crucible. A tapered plug of crucible material is forced into the crucible so that it presses on the surface of the uppermost pellet in order to exclude as much dead (i.e., empty) volume as possible. The tight fit is necessary because if there is dead (or empty) space in the crucible, the Se vapor will condense out on cooling and result in inhomogeneous products. The excess tantalum above the plug is peened over to form a tight closure. The crucible is then placed on a pedestal in a quartz vacuum system centered in a radio frequency induction heating coil. An ambient atmosphere of dry helium is often used in place of the vacuum. Power is delivered to the coil at a rate such that the crucible temperature rises to approximately 1700° C. at a rate of about 100°/min. The temperature, monitored by a pyrometer, is then raised to the melting point of the compound. Then the temperature is lowered and held slightly below the melting point. Since diffusion rates are extremely high at temperatures near the melting point, 10 minute heating at these temperatures increases homogeneity of the compound remarkably. The power is turned off and the sample cooled to room temperature. The $Gd_2Se_3$ sample appears as a dense, reddish-grey ingot which is brittle and oxidizes slowly in the presence of moist air. The room temperature electrical resistivity of this material is 3Ω cm. with a negative temperature coefficient. The material is antiferromagnetic with a Néel temperature of about 5° K.

The magnetic transition temperature of this material can be varied by doping to the level which is desired for use in the device of the invention for specific applications.

Doping can be achieved by changing the concentration of one of the components A or M in the $M_2A_3$ structure, or by addition of other metals or chalcogens, M′ or A′ respectively, representative examples of M′ are the rare earths (La, Ce, Pr, Nd, Sm, Eu, Gd, Tb, Dy, Ho, Er, Tm, Yb, Lu, and Y) and Sc, Ca, Mg, Ba, Sr, or any other elements soluble in the $M_2A_3$ structure and where A′ is a chalcogen (S, Se, and Te), or other non metals such as N, P, As, Sb, Bi etc. Specific examples of doping of $Gd_2Se_3$ by Gd (Example 2) and of $Gd_2Se_3$ by Y (Example 3) are given below.

*Example 2*.—$Gd_{2.172}Se_{3.000}$ (a) The process of Example 1 is repeated to prepare 1.603 gm. of $Gd_2Se_3$.

(b) The process of Example 1 is repeated except that in place of the gadolinium and selenium, 1.5725 gm. of Gd and 0.7896 gm. of Se pellets of ⅛″ diameter are weighed and mixed in a dry oxygen-free atmosphere. The resultant product is now GdSe.

(c) 1.603 gm. of $Gd_2Se_3$ and 0.429 gm. of GdSe are comminuted in a dry oxygen free atmosphere, and mixed carefully. This mixture of $Gd_2Se_3$ and GdS is pressed into pellets which are then placed in a crucible (which is a material that does not enter into the reaction, e.g., tantalum or molybdenum). The size of the pellet is such that it provides a piston fit to the crucible. A tapered plug of crucible material is forced into the crucible so that it presses on the surface of the pellets in order to exclude as much dead (i.e., empty) volume as possible. The tight fit is necessary because if there is dead (or empty) space in the crucible the Se vapor will condense out on cooling and result in inhomogeneous products. The excess tantalum above the plug is peened over to form a tight closure. The crucible is then placed on a pedestal in a quartz vacuum system centered in a radio frequency induction heating coil. An ambient atmosphere of helium is often used instead of the vacuum. Powered is delivered to the coil at a rate such that the crucible temperature rises to approximately 1700° C. at a rate of about 100°/min. The temperature monitored by a pyrometer is then raised to the melting point of the sample. Then the temperature is lowered and held slightly below the melting point of compound. Since diffusion rates are extremely high at temperatures near the melting point, 10 minutes heating at these temperatures increases the homogeneity of the samples remarkably. The power is turned off and the sample cooled to room temperature. The $Gd_{2.172}Se_{3.000}$ sample appears as a dense grey ingot. At room temperature the electrical resistivity has a value of approximately $10^{-3}$Ω cm. with a positive temperature coefficient of resistivity. The compound $Gd_{2.172}Se_{3.000}$ is ferromagnetic with a Curie temperature of about 80° K. as a result of the high conduction carrier concentration of this compound.

*Example 3*.—$Y_{0.517}Gd_{1.655}Se_{3.000}$ (a) The process of Example 1 is repeated to prepare 1.195 grams of $Gd_2Se_3$.

(b) The process of Example 1 is repeated except that in place of the gadolinium and selenium, 0.889 gram of Y and 0.789 gram of selenium pellets ⅛" diameter are weighed and mixed in dry oxygen free atmosphere. The resultant product is YSe.

(c) The process of Example 2c is repeated except that in place of $Gd_2Se_3$ and GdSe, 1.195 grams of $Gd_2Se_3$ and 0,227 gram of YSe are powdered, weighed, and mixed in a dry oxygen free atmosphere. The resultant product is $Y_{0.517}Gd_{1.655}Se_{3.000}$ and appears as a dense grey, brittle ingot. At room temperature the electrical resistivity has a value of the order of $10^{-2}$ Ω cm. The compound $Y_{0.517}Gd_{1.655}Se_{3.000}$ is ferromagnetic with a Curie temperature of about 55° K. as a result of the high conduction carrier concentration of this compound.

In the foregoing procedures, the volumetric configuration of the crucible is so selected as to produce the desired shape of the body of the finish device (e.g. a cylindrical rod, rectangular plate, or other shapes will known in the magnetics art). Alternately, any rare earth chalcogenides prepared by the above procedures may be comminuted to a powder and pressed into the shape desired for the body of the device. Conventional binders such as glue, or an 1,2-epoxy resin (a condensation product of epichloroyhdrin and bisphenol A), etc., may be used to improve cohesion and adhesion of the powder particles if desired.

II. The device of the invention, in addition to the body, includes a means of applying a magnetizing magnetic field to the body, such as an electric current loop or magnet poles. The purpose of the magnetizing magnetic field is to align all magnetic flux directions of the magnetic domain, and to direct the magnetic flux in that direction desired for any particular application. The alignment of the atomic magnetic moments in the semiconducting ferromagnetic body material arising from the conduction carrier density controlled coupling or other couplings is not unidirectional throughout the material. The magnetic flux splits up inside the body material, forming magnetic domains which are defined as regions having a unidirectional magnetic flux within the domain, which direction is different from the direction of neighboring domains. Since the magnetic flux of the domains, in general, is not aligned in that direction which is desired for the particular application of the magnetic flux of the body of the device of the invention a magnetizing magnetic field is applied in order to align the domains in that desired direction. The magnetizing magnetic field may be created in any suitable conventional manner, that is for example, by use of electric current loops or magnetic poles (permanent or induced). The strength of the magnetizing magnetic field influences the amount of magnetic flux density produced by the device of the invention in a manner that can be described by a hysteresis loop, magnetic permeability, saturation field strength, remanence, coercive force, and all the other parameters known in the art of ferromagnetic materials.

(III) Furthermore, the device of the invention, in addition to the semiconducting ferromagnetic body and means of applying magnetizing magnetic field, includes a mechanism or means for modulation of the conduction carrier density in the semiconducting ferromagnetic body described previously. These mechanisms or means are principally those known in semiconductor art for modulating or controlling conduction carrier concentration. That is, by transferring electrons or holes from one energy state to another energy state which is more or less favorable for the migration of the electrons or holes through the material than the energy state the electrons or holes had before applying the carrier density modulating means. A typical example of conduction carrier concentration modulating means is the irradiation of a semiconducting body by light (FIG. 1) of a frequency such that $h\omega \geqq E$ ($h=1.054\times10^{-27}$ erg.sec.) where E is the energy difference between the energy states of the electrons or holes mentioned above. Other examples are the reduction of the conduction carrier concentration by trapping the conduction carriers in surface states produced by the application of an electrical field (FIG. 2), increasing the conduction carrier concentration by elevation of the temperature, etc.

Consequently, the device of the invention combines a semiconducting ferromagnetic body, means for producing a magnetizing magnetic field and means of conduction carrier density modulation, and generates a magnetic flux with a desired direction and spatial distribution. The amount of this magnetic flux is controlled and modulated by irradiation with light, application of an electric field, or other means known to the semiconductor art for variation of the conduction carrier concentration in semiconductors. The controlled and modulated magnetic flux finds wide application in the design of devices in order to make these sensitive to and controllable by exposure to light, application of an electric field or other conditions known in the semiconductor art for controlling or modulating the conduction carrier density in semiconducting materials. For example, the modulation of this magnetic flux is used for inducing electric fields, e.g., in transformers, induction coils, motor generators, etc., or for the application of mechanical forces on magnetic materials or electric current loops, e.g., in relays, electric motors, etc. In certain cases of such uses, the continuous application of a magnetizing magnetic field to the body is only necessary for the initial activation of the device since the remnant flux remaining after the activation of the device is of sufficient magnitude for this use.

*Example 4.—Device producing a magnetic flux density modulated by incident light*

The device in FIG. 1 consists of the semiconducting ferromagnetic body 7 prepared as described above and which satisfies the requirements set forth previously. The shape of the body 7 is shown in one of its most basic forms, i.e., a cylindrical rod.

For FIG. 1 an example was selected in which it was desired that the magnetic flux passes through both end planes 9 and 10 of the body 7. The magnetizing magnetic field for the alignment of the domain magnetic flux into the direction of the axis of the cylindrical rod is produced by a solenoidal electrical current going through a wire wound between points 1 and 2 around the cylindrical body.

The light for the purpose of modulating the carrier density in the body 7 is shown to be coming from the light source 8 representing a natural light source or an artificial light source such as a tungsten bulb, a gas discharge lamp, a laser, etc. The intensity I and/or the wavelength λ of the light produced by the light source 8 is variable. As a consequence of the modulation of conduction carrier density in the body 7 during the change of the intensity I, (the wavelength λ or both) of the incident light, the body 7 undergoes a change in its magnetic properties as described by FIG. 3.

In FIG. 3, $B_0$ is the magnetic flux density delivered by the body 7 out of its end planes 9 and 10 at the temperature $T=0°$ K. under the influence of a constant magnetizing magnetic field. At any other temperature T the body produces the flux density B which is qualitatively given by the surve *a* (as a ratio) as long as the light source emits light of the intensity $I_1$ and of the wavelength $\lambda_1$ to the body 7. When the light intensity changes to the value $I_2>I_1$ with $\lambda_2=\lambda_1$ (or the wavelength changes to $\lambda_2<\lambda_1$ for $I_2\geqq I_1$) the value of the magnetic flux density B as a function of the temperature T follows another curve which is schematically represented by the curve *b* (as a ratio). Assuming the operating temperature $T_0$ of the device is constant, the variation of the light intensity from $I_1$ to $I_2$ (or the wavelength from $\lambda_1$ to $\lambda_2$ or of both at the same time) results in a modulation of the magnetic flux density coming out of the body 7 between the relative values $B'/B_0$ and $B''/B_0$. $T_c'$ and $T_c''$ are the ferromagnetic Curie temperatures of the body 7 measured during the absorption of light of the intensity $I_1$ and the wavelength $\lambda_1$ or $I_2$ and $\lambda_2$, respectively. Consequently, the magnetic flux density B coming out of the end planes of the body 7 of the flux producing device is light modulated and can be used like any other modulated magnetic flux density for producing mechanical forces, inducing electrical fields, etc., as for example, in relays and transformers, and in other known applications of magnetic flux producing devices.

When the semiconducting ferromagnetic body is $Gd_{2.172}Se_{3.000}$ (prepared as in Example 2), the saturation magnetic flux density ($B_s$) (obtained for an infinitely large magnetizing magnetic field at 0° K.) passing through the end planes of the unirradiated body of the device is measured to be about 13,800 gauss. At a working temperature of the device ($T_0$) which is about 90% of the Curie temperature $T_c=80°$ K., a magnetic flux density of about 4500 gauss is obtained for infinitely large magnetizing magnetic field from the unirradiated body. At a working temperature of the device ($T_0$) which is about 50% of the Curie temperature $T_c=80°$ K., a magnetic flux density of about 8,900 gauss is obtained for infinitely large magnetizing magnetic field from the unirradiated body.

$Gd_{2.172}Se_{3.000}$ has a high magnetic permeability and a low coercive force, therefore the dependence of the magnetic flux density B on the value of the magnetizing magnetic field is determined by the shape of the semiconducting ferromagnetic body (demagnetizing factor). When the semiconducting ferromagnetic body has a length to diameter ratio of 2, the magnetizing magnetic field strength necessary to saturate the magnetic flux density to about 4500 gauss at a working temperature ($T_0$) of 90% of the Curie temperature is above 650 oersteds. For a working temperature ($T_0$) which is 50% of the Curie temperature, the magnetizing magnetic field strength in order to saturate the magnetic flux density to about 8,900 gauss is above 1250 oersteds.

*Example 5.—Device producing a magnetic flux density modulated by an electric field*

The device in FIG. 2 consists of the semiconducting ferromagnetic body 7 prepared as described above and which satisfies the requirements set forth previously. The shape of the body 7 is shown as a rectangular plate, but it is not restricted to this configuration. For FIG. 2 an example was selected in which it was desired that the magnetic flux passes through opposite planes 9 and 10 of the body 7. The magnetizing magnetic field for alignment of the flux of the magnetic domains into the direction perpendicular to the end planes 9 and 10 is shown to be produced by a solenoidal electric current going through a wire wound around the rectangular body between points 1 and 2. The electric field used for the modulation of the conduction carrier density in the body 7 is shown to be defined by two metallic electrodes 5, charged negatively and positively at the points 3 and 4 respectively, and is the order of 1000 volts. The electrodes are parallel to two opposite planes of the rectangular body 7 and at right angles to the planes 9 and 10. The electrodes are electrically insulated from the body 7 by a highly insulating material 6, e.g., mica (in place of mica other well-known insulating materials such as ceramics, polystyrene, polytetrofluoroethylene, glass, etc. can be used).

The electric field generates surface states at the surface of the body 7 in close proximity to the electrodes 5. The conduction carriers are trapped in these surface states and the density of the conduction carriers in the body 7 is thereby reduced. If in FIG. 3 the curve *a* represents the dependence of the relative flux density as the ratio $B/B_0$ as a function of the temperature T at constant magnetizing magnetic field without an electric field, then the curve *b* corresponds to the relative flux density ratio $B/B_0$, while the body 7 is under the influence of an electric field for the same value of the magnetizing magnetic field. For a working temperature $T_0$ of the device, the application of the electric field results in the modulation of the magnetic flux density corresponding to the difference between the ratios $B''/B_0$ and $B'/B_0$. Thus, the magnetic flux passing through the end planes 9 and 10 of the body 7 of the magnetic flux producing device is electric field modulated and can, therefore, be used like any other modulated magnetic flux for producing mechanical forces, e.g., relays, or inducing electric fields, e.g., transformers, and in other ways known in the use of magnetic flux producing devices.

Using $Gd_{2.172}Se_{3.000}$ (prepared as in Example 2) as the material for the semiconducting ferromagnetic body of the device, the saturation magnetic flux density $B_s$ (obtained for an infinitely large magnetizing magnetic field at 0° K.) which passes through the opposite planes 9 and 10 of the body of the device is measured to be about 13,800 gauss in the absence of the electric field. At a working temperature of the device $T_0$ which is about 90% of the Curie temperature $T_c=80°$ K., a magnetic flux density of about 4,500 gauss is obtained for infinitely large magnetizing magnetic field in the absence of the electric field. At a working temperature of the device $T_0$ which is about 50% of the Curie temperature $T_c=80°$ K., a magnetic flux density about 8,900 gauss is obtained for infinitely large magnetizing magnetic field in absence of the electric field.

$Gd_{2.172}Se_{3.000}$ is a material with a high magnetic permeability and with a low coercive force. Therefore the dependence of the magnetic flux density B on the value of the magnetizing magnetic field is determined by the shape of the semiconducting ferromagnetic body (i.e., its demagnetizing factor). For a given shape of the body (e.g., the rectangular plate of this example) the demagnetizing factor and the value of the magnetizing magnetic field which saturates the magnetic flux density can be calculated by methods known in the magnetic art and as was done in Example 4 for a cylindrical rod.

In summary, there has been described above a device for the generation of a magnetic flux which is modulated and/or controlled by light or an electric field (or other means known to the semiconductor art, for changing the conduction carrier density in semiconductors) acting directly on the magnetic flux producing element of the device, using the dependence of magnetic transition temperatures on conduction carrier density but not using as a primary effect the dependence of the magnetic flux density on temperature or magnetizing magnetic field strength as is known in the use of ferromagnetic materials.

While the invention has been particularly shown and described with reference to preferred embodiments thereof, it will be understood by those skilled in the art that various changes in form and details may be made therein without departing from the spirit and scope of the invention.

What is claimed is:

1. A variable magnetic flux device comprising:
(a) a body of semiconducting ferromagnetic material;
(b) means for applying a magnetic field to said body;
(c) a variable means operative to vary conduction carrier density in said body in order to vary the magnetic flux of said body in accordance with the variation of said last-named means.

2. A variable magnetic flux device comprising:
(a) a body of semiconducting ferromagnetic material;
(b) means for applying a magnetic field to said body;
(c) means for irradiating said body from a source of radiant energy of variable intensity whereby the magnetic flux of said body will vary in accordance with energy content of said radiant energy.

3. A variable magnetic flux device comprising:
(a) a body composed of a semiconducting ferromagnetic material;

(b) means for applying a magnetic field to said body;

(c) means for irradiating said body from a source of radiant energy of variable wavelength whereby the magnetic flux of said body will vary in accordance with the wavelength of said radiant energy.

4. A variable magnetic flux device comprising:

(a) a body composed of a semiconducting ferromagnetic material;

(b) means for applying a magnetic field to said body;

(c) means for applying an electric field of variable intensity to said body whereby the magnetic flux of said body will vary in accordance with variations in strength of said applied electric field.

5. A magnetic flux device comprising:

(a) a body of ferromagnetic material with a conduction carrier density of less than $10^{20}$ per cu. cm.;

(b) means for orienting magnetic domains within said ferromagnetic material;

(c) means for controlling the conduction carrier density in said ferromagnetic material.

6. A device as defined in claim 1 where the semiconducting ferromagnetic material is a rare earth chalcogenide.

7. A device as defined in claim 1 where the semiconducting ferromagnetic material is a rare earth chalcogenide composed of gadolinium and selenium.

8. A device as defined in claim 1 where the semiconducting ferromagnetic material is $Gd_2S_3$.

9. A device as defined in claim 1 where the semiconducting ferromagnetic material is $Gd_{2.172}Se_{3.000}$.

10. A device as defined in claim 1 where the semiconducting ferromagnetic material is $Y_{0.517}Gd_{1.655}Se_{3.000}$.

References Cited by the Examiner

UNITED STATES PATENTS

| | | | |
|---|---|---|---|
| 2,008,753 | 7/1935 | Downing et al. | 23—50 |
| 2,176,495 | 10/1939 | Gordon et al. | 23—50 |
| 2,592,257 | 4/1952 | Dunlap | 323—63 |
| 2,814,015 | 11/1957 | Kuhrt | 323—63 |
| 2,936,373 | 5/1960 | Welker et al. | |
| 2,978,661 | 4/1961 | Miller et al. | 252—62.3 X |
| 3,102,959 | 9/1963 | Diemer | 250—211 |

BERNARD A. GILHEANY, *Primary Examiner.*

JOHN F. BURNS, *Examiner.*

G. HARRIS, Jr., *Assistant Examiner.*